United States Patent [19]

LeBlanc et al.

[11] Patent Number: 4,851,610
[45] Date of Patent: Jul. 25, 1989

[54] MAGNETIC CARD PROTECTION SYSTEM

[75] Inventors: Kenneth L. LeBlanc; Gavin M. Hall, both of Burnaby, Canada

[73] Assignee: Integrated Card-Gard Corporation, Burnaby, Canada

[21] Appl. No.: 182,775

[22] Filed: Apr. 18, 1988

[30] Foreign Application Priority Data

Mar. 14, 1988 [CA] Canada ................................ 561415

[51] Int. Cl.⁴ .............................................. H05K 9/00
[52] U.S. Cl. ................................... 174/35 R; 150/147
[58] Field of Search ....................... 174/35 R, 35 MS; 150/131, 147; 206/444

[56] References Cited

U.S. PATENT DOCUMENTS

| | | | |
|---|---|---|---|
| 4,141,400 | 2/1979 | Mangan | 150/39 |
| 4,438,164 | 3/1984 | Pfeifer et al. | 428/35 |
| 4,450,955 | 5/1984 | Featherston | 206/39.6 |
| 4,514,586 | 4/1985 | Waggoner | 174/35 MS |
| 4,593,736 | 6/1986 | Morita | 150/147 |
| 4,647,714 | 3/1987 | Goto | 174/35 R |

OTHER PUBLICATIONS

Waters, C. T.; Shielded Carrier for Encoded Badges; IBM Technical Disclosure Bulletin; vol. 18, No. 5, Oct. 1975, p. 1328.

Primary Examiner—Morris H. Nimmo
Attorney, Agent, or Firm—Christie, Parker & Hale

[57] ABSTRACT

A protective device for protecting the information on magnetically encoded areas of plastic cards comprising strips of a ferro-magnetic amorphous composition having a metal-glass characteristic situated adjacent and covering the magnetically encoded areas on either side so as to redirect any corrupting electromagnetic and statomagnetic fields. In a preferred embodiment, the protective strips are incorporated in a card holding unit.

10 Claims, 1 Drawing Sheet

MAGNETIC CARD PROTECTION SYSTEM

FIELD OF THE INVENTION

This invention relates to a protective device for protecting plastic cards having a magnetic strip area containing encoded information such as credit cards and the like from corrupting statomagnetic or electromagnetic fields.

BACKGROUND OF THE INVENTION

Today, plastic cards such as credit cards or bank cards very often have a magnetically encoded area on their rear surface containing important information about the card owner. This magnetically encoded area very often takes the form of a black strip across the length of the card. This magnetically coded information is read by banking machines to allow the user to conduct regular banking transactions.

Sophisticated security systems also use magnetically encoded identification badges.

These cards having magnetically encoded areas are often carried by people in specially sized pockets in their wallet or purse. Unfortunately, such holders provide little protection from stray statomagnetic or electromagnetic radiation that can cause corruption of data on the card thereby rendering the card useless for all applications that require the magnetic data to be read from the card. Statomagnetic corrupting fields are not uncommon and are sometimes generated by the magnetic clasps sometimes used in purses or wallets. Electromagnetic fields are generated by the motors and components of electrical appliances.

Protective enclosures for protecting and housing magnetic cards are known. For example, Morita in U.S. Pat. No. 4,593,736 discloses a case or bag for protecting and housing cards having a magnetic strip. The case or bag is provided with a strongly magnetic outer mesh and a lining material is used to separate the card from the magnetic mesh. Other relevant prior art includes U.S. Pat. No. 4,514,586 to Waggoner.

SUMMARY OF THE INVENTION

Unlike the Morita patent, the protective device of the present invention uses a non-magnetic foil to redirect corrupting magnetic fields. Accordingly, the present invention is a protective device for protecting the information on magnetically encoded areas of plastic cards comprising strips of a ferro-magnetic amorphous composition having a metal-glass characteristic situated adjacent and covering said magnetically encoded areas on either side so as to redirect any corrupting electromagnetic fields.

In a preferred embodiment, the protective strips of the present invention are mounted in the lining of a card holder to protect the magnetic areas of any cards inserted into the holder.

In a further embodiment, the protective strips are provided with an adhesive surface so that the strips may be positioned on existing card holding articles so as to protect the magnetic areas of the cards.

BRIEF DESCRIPTION OF THE DRAWINGS

Various embodiments of the present invention are illustrated in the following drawings in which.

DESCRIPTION OF THE PREFERRED EMBODIMENTS

Figure 3:
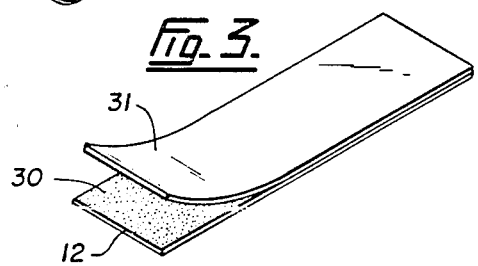
FIG. 3 shows the protective strips with an adhesive surface.

FIG. 3 provides a view of a protective strip 12 according to the present invention. Protective strip 12 of the present invention is formed from an amorphous alloy having a high saturation inductance. The material has a very low core loss and weight. The amorphous alloy is a ferrous-boron or ferrous nickel mixture having a saturation inductance of about 10,000 gauss and a permeability of 500,000 gauss/oersted. Core loss of the alloy in a magnetic field of 1.6 Tesla @400 Hz is less than half that of 4 mil. 3% silicon iron. A number of alloys have been developed that meet the above requirements. A preferred alloy composition is comprised of 67 percent iron, 14 percent boron, 1 percent silicon and 18 percent cobalt by weight. A second alloy composition is comprised of 79 percent iron, 16 percent boron and 5 percent silicon by weight. A third alloy composition is comprised of 40 percent iron, 38 percent nickel, 4 percent molybdenum and 18 percent boron by weight.

Preferably the alloy is formed into a cold rolled foil of a selected thicknesses depending on the desired degree of protection. From this foil sheet, strips of appropriate width can be cut to provide protection for a magnetically encoded area. A pair of strips are positioned adjacent the magnetically coded area of a card, each strip being of sufficient width to overlap the magnetically coded area by more than half the strips width. The strips are positioned on either side of the magnetic area such that any corrupting magnetic field is held within the strip's core and moved to the outer edges of the strips away from the magnetically encoded area.

Figure 1:
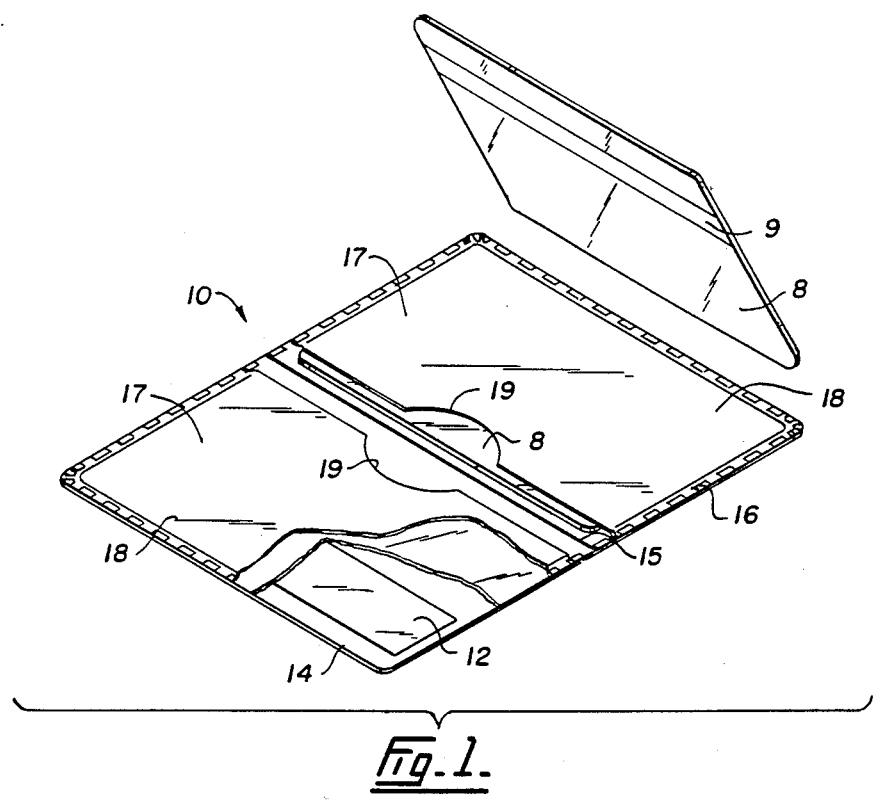
FIG. 1 shows a card holder incorporating the protective strips of the present invention.

Referring to FIG. 1, there is shown a first embodiment of card holding means 10 incorporating the protective strips 12 of the present invention such that the strips are correctly positioned about a card inserted into the card holding means. Card holding means 10 is formed from two rectangular backing sheets 14 of a suitable flexible material such as plastic. Protective strips 12 are sandwiched between the two backing sheets 14 and extend across either end of the card holder 10 on opposite sides of central folding axis 15. The backing sheets are joined by a conventional seaming process that creates seam 16 about the perimeter of the card holder. Central folding axis 15 is preferably formed by scoring the joined backing sheets to create a permanent fold line. Pockets 17 for holding plastic cards 8 are preferably formed from a clear plastic material 18 to allow for inspection of the inserted cards. Plastic cards 8 are inserted so that the magnetically encoded area 9 is facing and adjacent protective strips 12. Optionally, notch 19 may be provided in material 18 to ease removal of plastic cards 8 from pockets 17. Pockets 17 are formed by sealing three edges of the pocket material 18 with seam 16. When the card holder 10 of the present embodiment is folded over into a closed position, protective strips 12 are positioned on either side of the plastic cards inserted in pocket 17.

Figure 2:
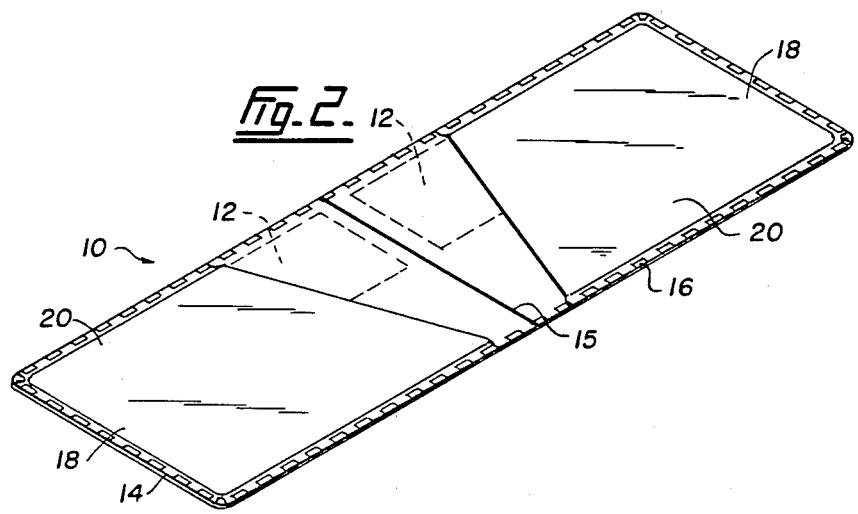
FIG. 2 shows a different embodiment of a card holder.

FIG. 2 illustrates an alternative card holding means 20. This embodiment is similar to the embodiment of FIG. 1 and analogous parts are identically labelled. Protective strips 12 are positioned along the same side edge 22 of the card holder 10 on opposite sides of central folding axis 15 such that when the card holder is folded the strips will be positioned on opposite sides of the inserted cards. Plastic material 18 forming pockets 17 has an angled open end for easy removal of inserted cards. It is important that plastic cards 8 are inserted such that magnetically encoded area 9 is facing and adjacent protective strips 12.

FIG. 3 illustrates a further embodiment of the present invention comprising a protective strip 12 having an adhesive face 30. Adhesive face 30 covered by a removable layer 31. In a conventional manner, removable layer 31 can be peeled away and the strip 30 positioned in an existing card holding means in the vicinity of plastic cards having magnetically encoded areas.

The protective strips of the present invention work by virtue of the fact that the alloy used to form the strips has the ability to redirect the lines of force in a magnetic field to the outer edges of the strip. This prevents saturation through the central region of the protective strip which overlies the magnetically encoded area of a plastic card thereby preventing corruption or damage of the encoded information.

The protective strips of the present application will protect plastic cards from statomagnetic and electromagnetic fields generally. However, the strips will not protect against intense magnetic fields such as direct contact with a magnet.

We claim:

1. A protective device for protecting the information on magnetically encoded areas of plastic cards comprising strips of a ferromagnetic amorphous composition having a metal-glass characteristic to be situated adjacent and covering magnetically encoded areas on either side of plastic cards so as to redirect any corrupting electromagnetic fields.

2. A device as claimed in claim 1 in which said amorphous composition comprises an alloy containing the elements iron, boron, silicon and cobalt.

3. A device as claimed in claim 2 in which said alloy is 67 percent iron, 14 percent boron, 1 percent silicon and 18 percent cobalt by weight.

4. A device as claimed in claim 1 in which said amorphous composition comprises an alloy containing the elements iron, boron and silicon.

5. A device as claimed in claim 4 in which said alloy is 79 percent iron, 16 percent boron and 5 percent silicon by weight.

6. A device as claimed in claim 1 in which said amorphous composition comprises an alloy containing the elements iron, nickel, molybdenum and boron.

7. A device as claimed in claim 6 in which said alloy is 40 percent iron, 38 percent nickel, 4 percent molybdenum, and 18 percent boron by weight.

8. A device as claimed in claim 1 in which said strips have a saturation inductance of slightly greater than 10,000 gauss and a saturation permeability of approximately 500,000 gauss/oersted.

9. A device as claimed in claim 1 in combination with card holding means having an essentially rectangular shape with pockets adapted for receiving plastic cards on either side of a central folding axis, said strips being positioned in said pockets such that upon folding the card holding means about its central axis said strips are positioned on either side of magnetically encoded areas on either side of plastic cards.

10. A device as claimed in claim 1 in which said strips have a self-adhesive surface whereby said strips may be attached in existing card holding means.

* * * * *